US012191616B2

(12) United States Patent
Dietz

(10) Patent No.: US 12,191,616 B2
(45) Date of Patent: Jan. 7, 2025

(54) WIRING CHAMBER WITH MULTIPLE TERMINATIONS

(71) Applicant: Hubbell Incorporated, Shelton, CT (US)

(72) Inventor: William Henry Dietz, Branford, CT (US)

(73) Assignee: Hubbell Incorporated, Shelton, CT (US)

( * ) Notice: Subject to any disclaimer, the term of this patent is extended or adjusted under 35 U.S.C. 154(b) by 343 days.

(21) Appl. No.: 17/795,468

(22) PCT Filed: Jan. 8, 2021

(86) PCT No.: PCT/US2021/012721
§ 371 (c)(1),
(2) Date: Jul. 26, 2022

(87) PCT Pub. No.: WO2021/154478
PCT Pub. Date: Aug. 5, 2021

(65) Prior Publication Data

US 2023/0072332 A1 Mar. 9, 2023

Related U.S. Application Data

(60) Provisional application No. 62/968,020, filed on Jan. 30, 2020.

(51) Int. Cl.
*H01R 4/36* (2006.01)
*H01R 11/09* (2006.01)

(52) U.S. Cl.
CPC ............ *H01R 4/363* (2013.01); *H01R 11/09* (2013.01)

(58) Field of Classification Search
CPC .......... H01R 4/363; H01R 11/09; H01R 11/26
See application file for complete search history.

(56) References Cited

U.S. PATENT DOCUMENTS

| | | | |
|---|---|---|---|
| 3,654,592 | A | 4/1972 | Prinorac |
| 4,195,895 | A | 4/1980 | Ziegler |
| 4,571,013 | A | 2/1986 | Suffi |
| 4,875,876 | A | 10/1989 | O'Loughlin |

(Continued)

FOREIGN PATENT DOCUMENTS

| | | |
|---|---|---|
| WO | 2019239024 | 12/2019 |

OTHER PUBLICATIONS

International Preliminary Report on Patentability mailed on PCT/US21/12721 on Aug. 11, 2022 (15 pages).

(Continued)

*Primary Examiner* — Briggitte R. Hammond
(74) *Attorney, Agent, or Firm* — Wissing Miller LLP

(57) ABSTRACT

There is provided a terminal for an electrical power cable that includes a conductive clip, a terminal block, and a set screw. The clip resides in the terminal block and includes a plurality of openings sized to receive low voltage connectors, such as spade connectors. The openings in the clip are arranged to organize the spade connectors and their respective pigtail connections. The location and orientation of the clip and the spade connectors is such that, when the set screw is installed in the terminal block, force is applied by the set screw onto the clip. The clip compresses and secures the spade connectors to the terminal block.

19 Claims, 8 Drawing Sheets

(56) References Cited

U.S. PATENT DOCUMENTS

| | | | | |
|---|---|---|---|---|
| 9,472,871 | B2 * | 10/2016 | Lin | H01R 4/4823 |
| 2002/0024812 | A1 | 2/2002 | Agro | |
| 2018/0144899 | A1 | 5/2018 | Sweeney | |

OTHER PUBLICATIONS

International Search Report and Written Opinion mailed in PCT/US21/12721 on May 25, 2021 (15 pages).

Partial Supplementary European Search Report in corresponding European Application No. 21747264.6 mailed Jan. 29, 2024. (12 pages).

Extended European Search Report in corresponding European Application No. 21747264.6 mailed Apr. 24, 2024. (11 pages).

* cited by examiner

Fig. 7c
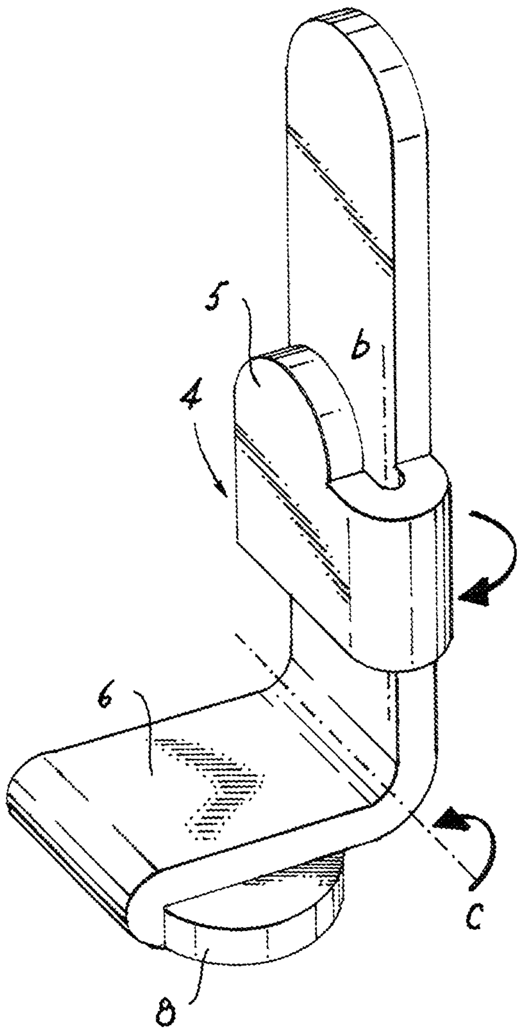
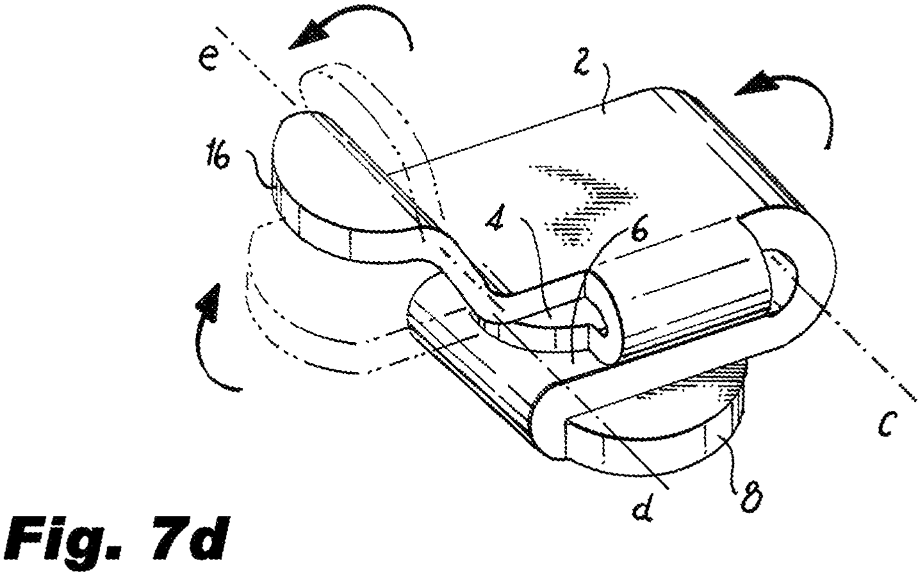
Fig. 7d

WIRING CHAMBER WITH MULTIPLE TERMINATIONS

RELATED APPLICATION DATA

This application is a 371 of PCT/US 2021/012721, filed on Jan. 8, 2021, published on Aug. 5, 2021 under publication number WO 2021/154478, which claims priority benefits under 35 U.S.C. § 119 to U.S. Provisional Patent Application No. 62/968,020, filed on Jan. 30, 2020. The disclosures of these applications are incorporated herein by reference.

BACKGROUND

Field

The present disclosure relates to electrical terminal connectors. In particular, the present disclosure describes a terminal connector adapted to securely connect an electrical cable with a plurality of low-voltage connectors, arrange the connectors to facilitate connection to low-voltage equipment, and secure the connectors with a set screw.

Description of the Related Art

Industrial cables are used to carry electrical power to equipment. Terminal connectors provide secure connections between cables and the equipment. Such terminal connectors include a mechanism for electrically connecting the cable conductor to a terminal block, as well as a mechanism for mechanically securing the terminal block to the cable so that the connection is reliable.

The electrical conductors in cables designed to deliver power to industrial equipment are relatively large so that high electrical current is carried by the cable with a minimum of loss due to electrical resistance. A terminal block for such a cable is generally sized to accommodate the electrical conductor and to mechanically connect with the insulation surrounding the cable.

In some instances, the same kind of cable used to deliver electrical power is also used to carry low-voltage signals. In some cases, communication, control, and/or monitoring signals need to be communicated to and from the equipment, for example, to monitor and control the speed of a motor or to indicate alarm condition. In order to interface the conductor in a power cable to equipment designed to monitor these low-voltage signals, an auxiliary contact set is provided. The auxiliary contact set provides a path for low-voltage signals, e.g., computer data packets, to pass to and from the equipment.

There is a need to provide a terminal connector that connects relatively large sized cables deigned to deliver power to industrial equipment, with one or more low-voltage wires to communicate communication, control, and monitoring signals to and from the industrial equipment.

SUMMARY

The present disclosure relates to apparatuses and methods to address these difficulties.

According to one embodiment there is provided a terminal for an electrical power cable that includes a conductive clip, a terminal block housing, and a set screw. The clip resides in the terminal block and includes a plurality of openings sized to receive low voltage electrodes, such as spade connectors. The openings in the clip are arranged to organize the spade connectors and their respective pigtail connections. The location and orientation of the clip and the spade connectors is such that, when the set screw is installed in the terminal block, force is applied by the set screw onto the clip. The clip compresses and secures the spade connectors to the terminal block.

According to one embodiment, a terminal connector is disclosed. The connector is includes a terminal block. A bore hole and a connector hole are provided in the terminal block. The connector hole intersects the bore hole. The connector hole comprises an opening in the terminal block adapted to accept insertion of one or more electrodes. A clip is disposed within the bore hole. The clip comprises an upper planar contactor, a lower planar contactor, and a tongue having an upper and a lower tongue surface. The tongue is disposed between the upper contactor and lower contactor. The spaces between the tongue and the upper and lower contactors are each adapted to receive the electrode through the connector hole. The bore hole comprises a threaded inner surface and the terminal connector further comprises a set screw engaged with the threaded surface of the bore hole. The set screw exerts force on the clip to compress the upper planar contactor toward the upper tongue surface and the lower tongue surface toward the lower planar contactor. According to one aspect the electrode is a spade connector.

According to another embodiment, the clip may be formed from a contiguous piece of material. The upper planar contactor and the lower planar contactor are connected by a first c-shaped bend about a first axis and the tongue is connected with one of the upper planar contactor or the lower planar contactor by a second c-shaped bend about a second axis. The first and second axes are orthogonal to one another. The clip may further comprise a base plate with the base plate disposed below the lower planar contactor. The base plate may be shaped to conform to and engage with at least a portion of an inner diameter of the bore hole and to rest on a bottom surface of the bore hole with the first axis disposed horizontal and perpendicular to the connector hole, and the second axis disposed parallel to connector hole. The tongue may include a ramped portion on one or more of the upper tongue surface and lower tongue surface with the ramped portion arranged along an edge of the tongue facing the connector hole. One or more of the upper tongue surface and lower tongue surface may have an embossment. The embossment may be a smooth surface, a textured surface, or a partial cylindrical slot. The clip may include a capture prong above the upper planar contactor with the capture prong shaped to engage with an inner diameter of the bore hole so that engagement between the capture prong and the bore hole retains the clip within the bore hole.

According to another embodiment of the disclosure a method of forming a clip for a terminal connector is disclosed. The method comprises the steps of providing a sheet of conductive material and providing a punch die. The punch die includes a blade that defines an upper planar contactor shaped region, a lower planar contactor shaped region, a contactor connector region, and a tongue shaped region. The tongue shaped region is contiguous with one of the upper contactor shaped region and the lower contactor shaped region. The contactor connector region is contiguous with the upper and lower planar contactor shaped regions. The steps further comprise applying the punch die to the sheet so that a clip blank is cut from the sheet by the punch die. The upper planar, lower planar, and tongue shaped regions of the die form an upper contactor and a lower contactor connected by a contact connector and a tongue connected with one of the upper contactor and the lower contactor. The method may further comprise first bending the tongue perpendicular to a face of the clip blank about a first axis, and second bending the contact connector about a second axis perpendicular to the first axis so that the upper and lower connectors are substantially parallel with the tongue. Following the step of punching, the method may further comprise embossing one or more surface features on the tongue. The surface feature may include a sloped ramp portion along an edge of the tongue on at least one of an upper tongue surface or a lower tongue surface, a slot adapted to conform to a portion of a cylindrical electrode, or a textured surface adapted to provide a mechanical connection with a surface of a spade connector. The material forming the clip may be a metal or metal alloy. That metal alloy may be an alloy of copper, iron, or lead and may be selected from spring steel, phosphor bronze, beryllium copper and an alloy of lead.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 7*a*, 7*b*, 7*c*, and 7*d* are perspective views showing steps for forming a clip according to an embodiment of the disclosure.

DETAILED DESCRIPTION

Figure 1:
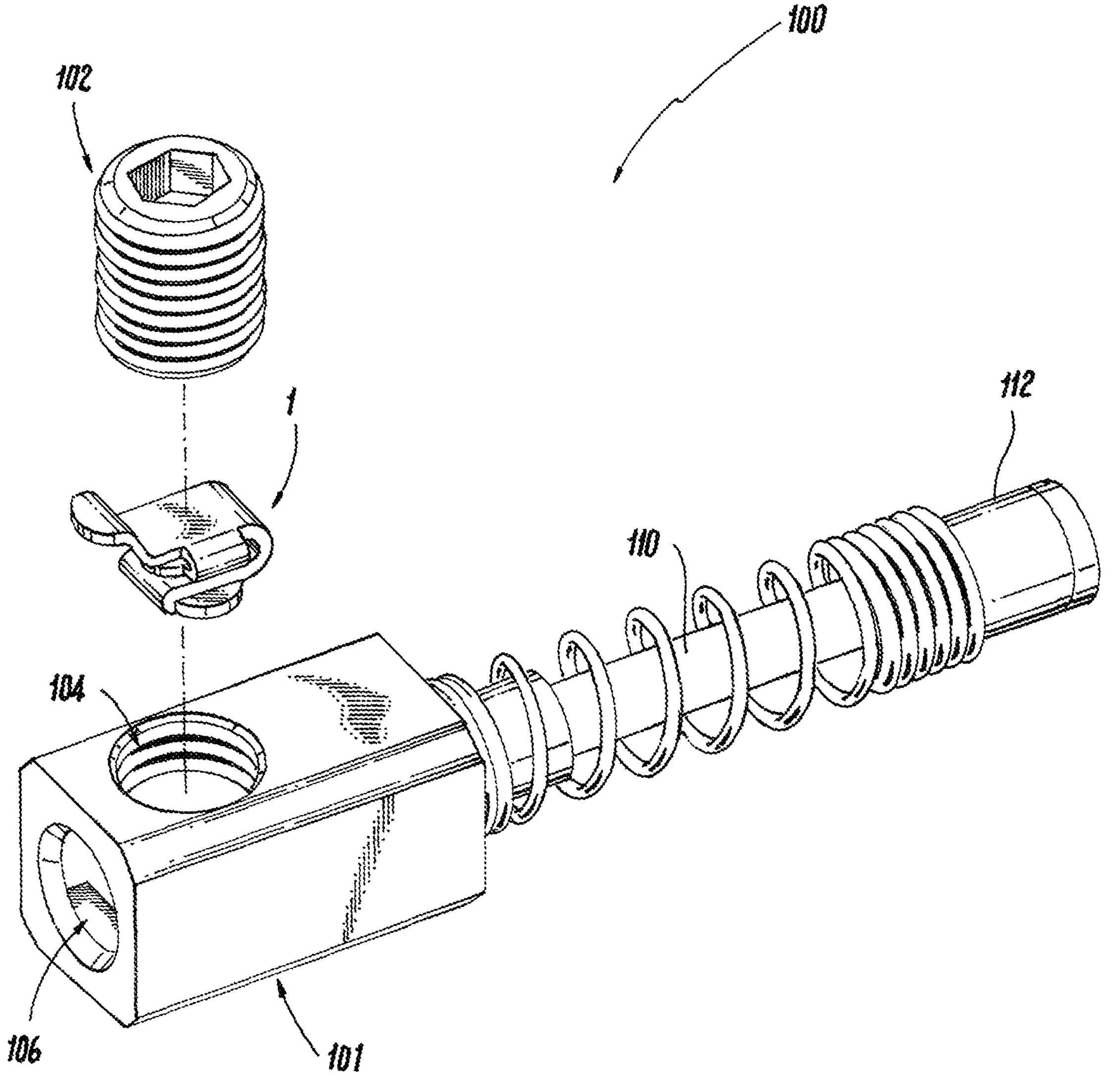
FIG. 1 is a perspective exploded view of a terminal block according to an embodiment of the disclosure.

FIG. 1 shows an exploded perspective view of a terminal 100 according to an embodiment of the disclosure. A terminal block 101 is secured to an electrical cable 112. The cable includes a conductor 110. Conductor 110 is in electrical communication with the block 101 so that electrical power and electrical signals on conductor 110 are communicated via cable 112 to block 101.

Terminal block 101 includes a bore hole 104 through the top face of the block. Bore hole 104 includes internal screw threads. Set screw 102 fits into bore hole 104 and engages with the internal threads when the terminal 100 is assembled. Bore hole 104 may be a blind hole that terminates at a bottom surface proximate to the bottom face of the block. Block 101 also includes a connector hole 106. According to one embodiment, connector hole 106 extends through a face of the block perpendicular to the top face. Connector hole 106 intersects with bore hole 102.

Figure 2:
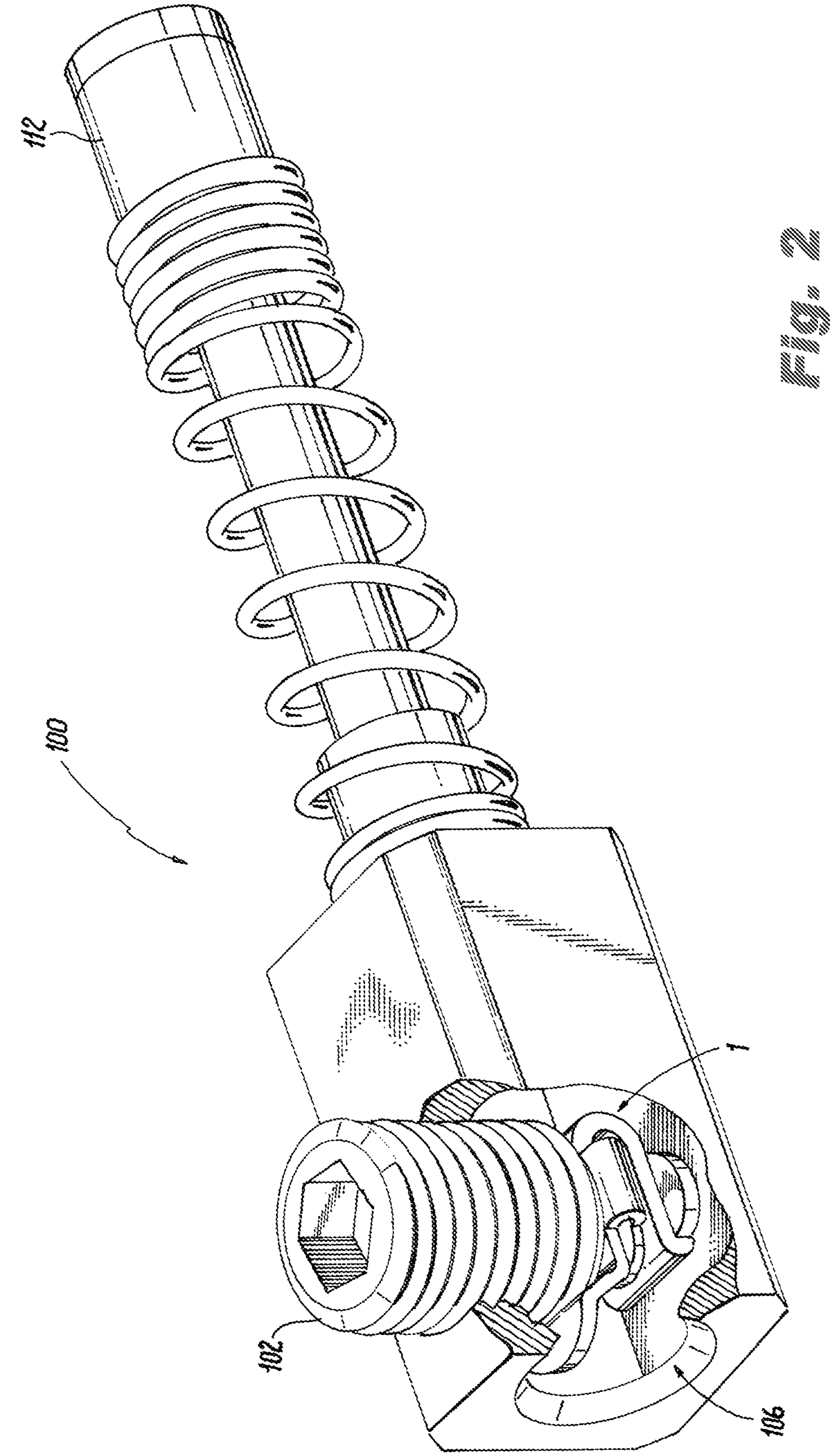
FIG. 2 is a perspective view of the terminal block of the embodiment of FIG. 1 with a portion cut away to show the internal structure.

Disposed within bore hole 104 is clip 1. FIG. 2 is a perspective view showing terminal 100 assembled. Clip 1 rests on the bottom surface of bore hole 104. Set screw 102 is threaded into bore hole 104 and contacts a top surface of clip 1. When set screw 102 is turned to thread into block 101, it applies a downward force on clip 1, compressing clip 1.

Figure 3A:
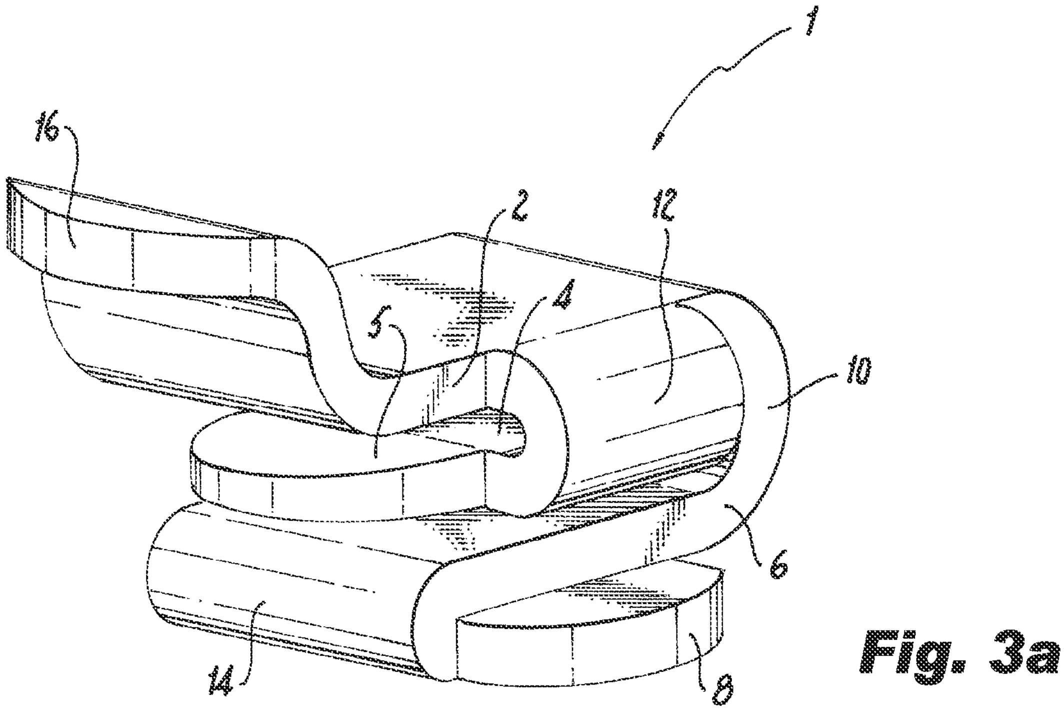
FIGS. 3*a* and 3*b* are perspective views of a clip that forms part of the embodiment of FIG. 1.
Figure 3B:
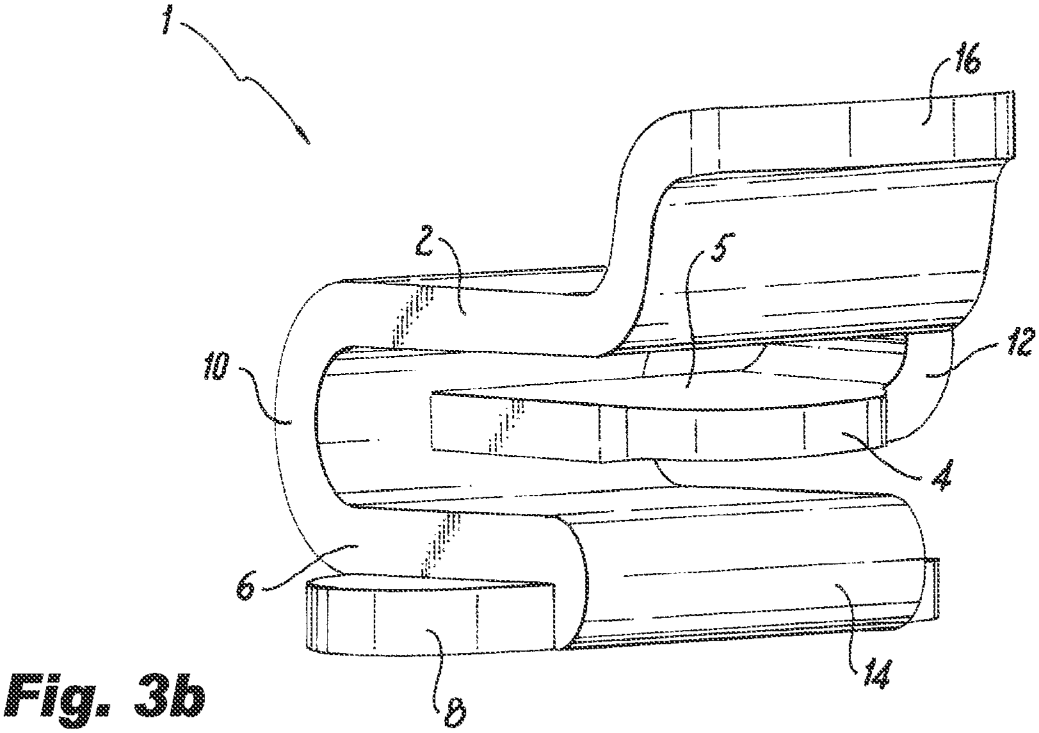

FIGS. 3*a* and 3*b* are right and left perspective view of clip 1. Clip 1 includes an upper contactor 2, a tongue 4, and a lower contactor 6. The space between upper contactor 2 and tongue 4 is designed to allow a first electrode to be inserted. Likewise, the space between tongue 4 and lower contactor 6 is designed to allow a second electrode to be inserted. Clip 1 also includes a base 8 at the bottom end and a prong 16 at an upper end. As shown in FIG. 2, when clip 1 is installed in block 101, base 8 rests on the bottom surface of bore hole 104. Prong 16 fits inside bore hole 104. Base 8 and prong 16 may have one or more radiused surfaces shaped to engage with the inner diameter of bore hole 104. Engagement of clip 1 with bore hole 104 keeps the clip securely in place inside bore hole 104.

In the embodiment shown in FIGS. 3*a* and 3*b*, upper and lower contactors 2 and 6 are connected by bend 10 and tongue 4 is connected with upper contactor 2 by bend 12. According to another embodiment, tongue 4 connects with lower contactor 6 by a bend, instead of being connected with upper contactor 2.

When clip 1 is installed in block 101, openings between tongue 4 and upper and lower contactors 2, 6 are positioned to face connector hole 106 as shown in FIG. 2. This arrangement allows connectors to be inserted between contactors 2, 6 and tongue 4 via connector hole 106. According to one embodiment, the spaces between the contactors and the tongue are sized and shaped to fit spade connectors. According to one exemplary embodiment, the openings are sized to fit ¾" wide male spade connectors, such as Master Electrician™ ¼" Male Tab connectors.

According to one embodiment, tongue 4 includes a ramped portion 5. The ramped portion 5 is shaped to provide a wider opening for insertion of a spade connector into the clip and to guide the spade connector into alignment with openings of the clip.

Figure 4:
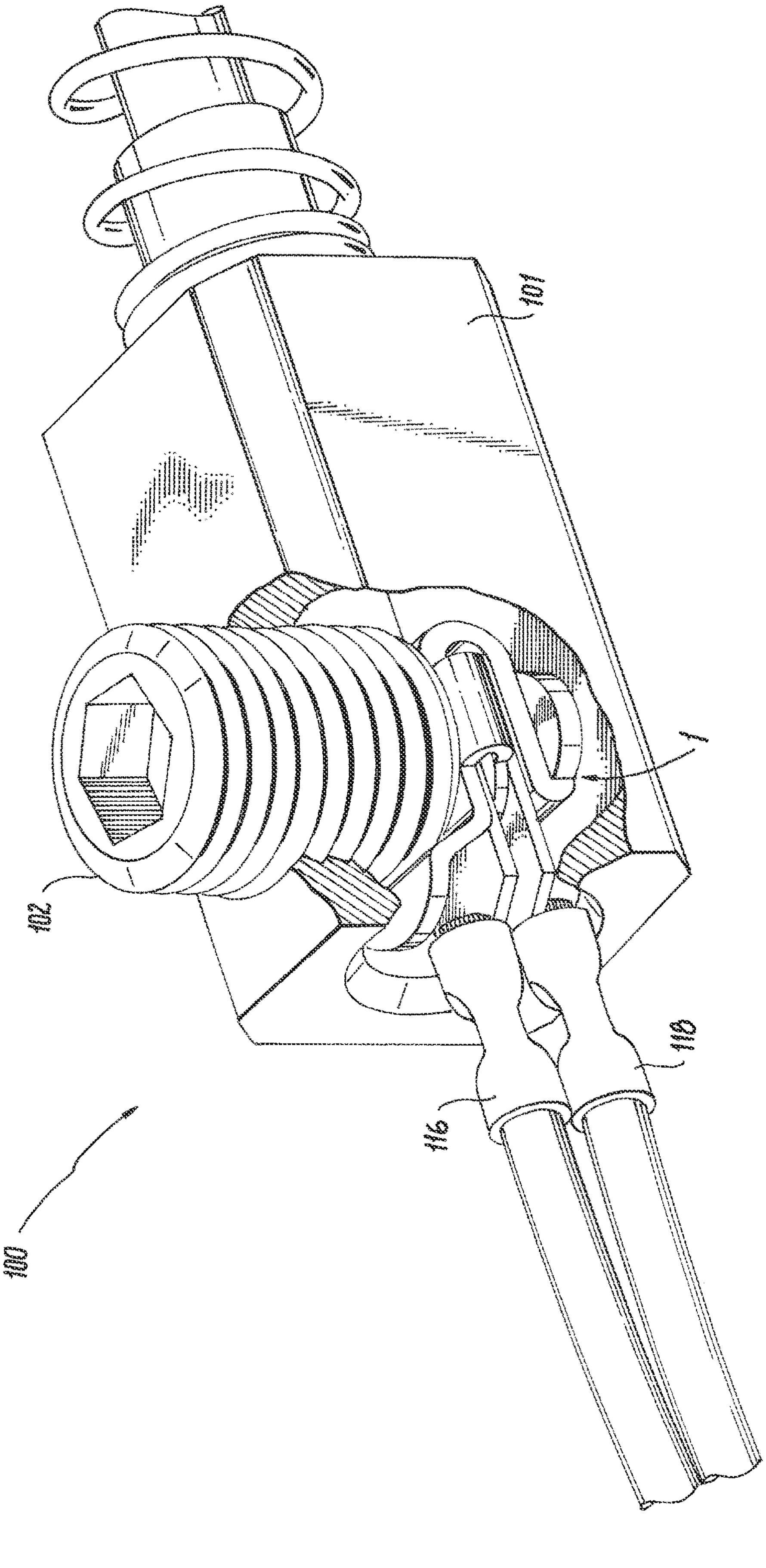
FIG. 4 is a perspective view of the terminal block of the embodiment of FIG. 1 assembled and connected with low voltage conductors with a portion cut away to show the internal structure.
Figure 5:
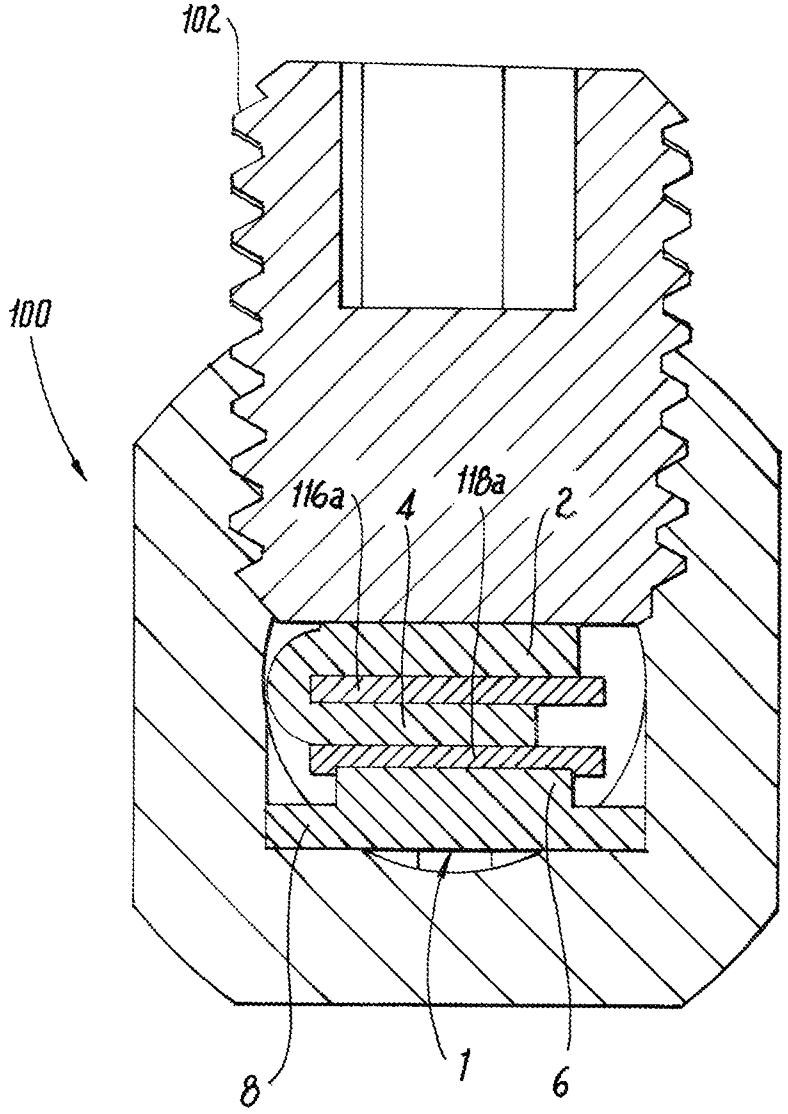
FIG. 5 is a cross section of the terminal block of the embodiment of FIG. 1 connected with low-voltage conductors.

FIG. 4 shows a perspective view of spade connectors 116 and 118 inserted into clip 1 inside terminal block 101. FIG. 5 shows a cross section of blades 116*a* and 118*a* of the spade connectors inserted into clip 1.

According to one embodiment, set screw 102 is initially threaded loosely into bore hole 104 so that it exerts little or no compressive force on clip 1. In this configuration, openings between contactors 2, 6 and tongue 4 are wide enough to easily accept insertion of blades 116*a*, 118*a*. Once the blades are inserted into clip 1, set screw 102 is rotated to thread into block 101 and apply force to compress clip 1 against the bottom surface of bore hole 104. This causes contactors 2 and 6 to compress blades 116*a*, 118*a* against tongue 4 and secure connectors 116, 118 to terminal 100. This also assures a good electrical connection between the connectors and the terminal. In addition, as shown in FIG. 4, because the spade connectors 116, 118 are secured parallel with one another, wires that attach to connectors 116, 118 are organized with respect to one another to facilitate interfacing signals to and from conductor 112 with control systems and other low-voltage circuitry.

According to another embodiment of the disclosure, surfaces of contactors 2, 6 and tongue 4 are textured to provide greater friction with the surface of blades 116*a*, 118*a*. For example, ridges, peaks, or grooves may be embossed on the surface of one or more of the contactors and the tongue so that, when clip 1 is compressed, a more secure mechanical connection with blades 116*a*, 118*a* is formed.

Figure 6:
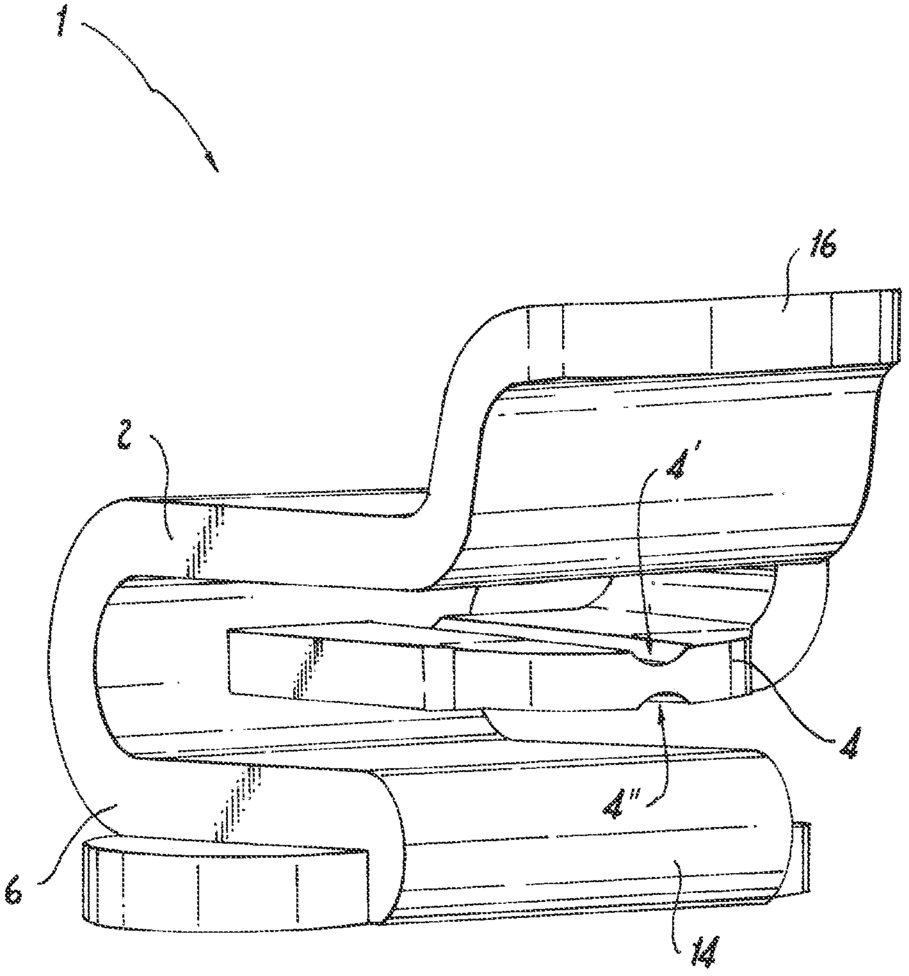
FIG. 6 is a perspective view of a clip forming part of a terminal block according to another embodiment of the disclosure.

According to a further embodiment, clip is shaped to accept other types of conductors than spade connectors. According to one embodiment, shown in FIG. 6, the upper and lower surfaces of tongue 4 are provided with half-cylindrical grooves 4' and 4" that are oriented parallel with the direction a conductor is inserted via connector hole 106 when the clip is installed in terminal block 101. With this arrangement, a wire, such as a solid, single conductor wire, the tinned end of a stranded wire, or other cylindrical conductor may be inserted into clip 1 and rest partially within groove 4' or 4". The radius of the cylindrical conductor is selected to be the same or slightly larger than the groove. When clip 1 is uncompressed, that is, before set screw 102 is fully threaded into block 101, the cylindrical conductor fits between one of the grooves 4', 4" and the surface of respective upper or lower contactor 2, 6. When set screw 102 is driven into block 101, the contactor presses the cylindrical conductor against the surface of groove 4', 4". By providing a groove to accept insertion of a cylindrical conductor, such as a wire, the conductor is held in alignment with the terminal 100, thus organizing the conductor with respect to the terminal. According to this embodiment, a cylindrical conductor may be inserted into one opening, e.g., between the upper contactor 2 and the tongue 4, and a spade connector could be inserted in the other opening between the lower contactor 6 and the tongue 4, or vice versa.

Figure 7A:
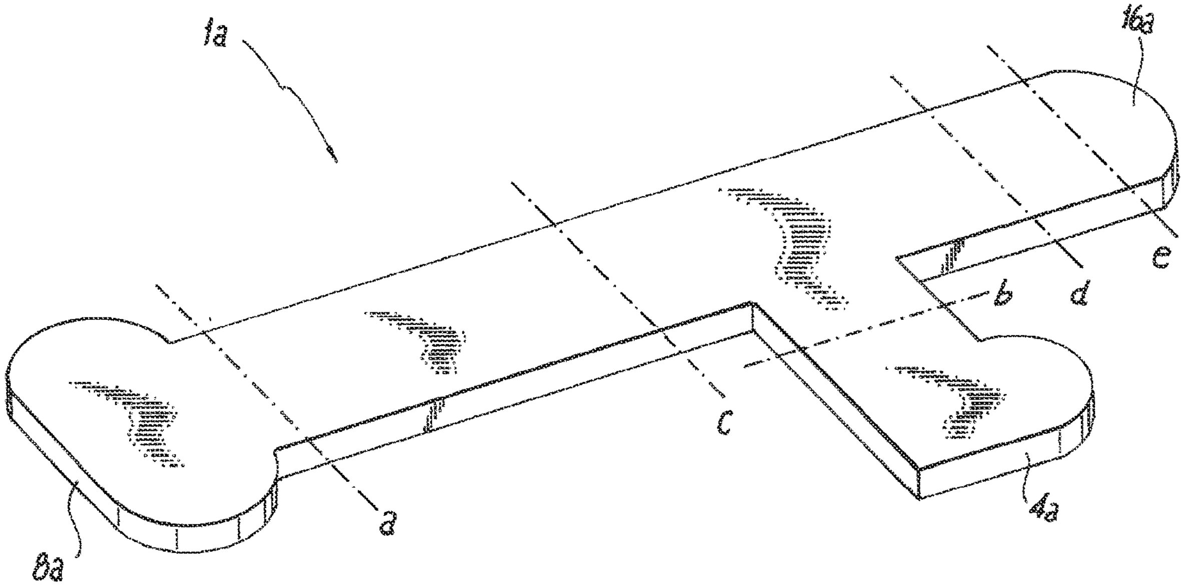

FIG. 7*a-d* show steps for forming clip 1 according to an embodiment of the disclosure. As shown in FIG. 7*a*, a blank 1*a* is formed from a sheet of conductive, malleable material suitable for forming clip 1. A base region 8*a* is provide at one end of the blank and will form the base 8 of the finished clip. A prong portion 16*a* is provided at the other end of the blank and will form the prong 16 of the finished clip. A tongue portion 4*a* is provided to form the tongue 4 of the finished clip.

Figure 7B:
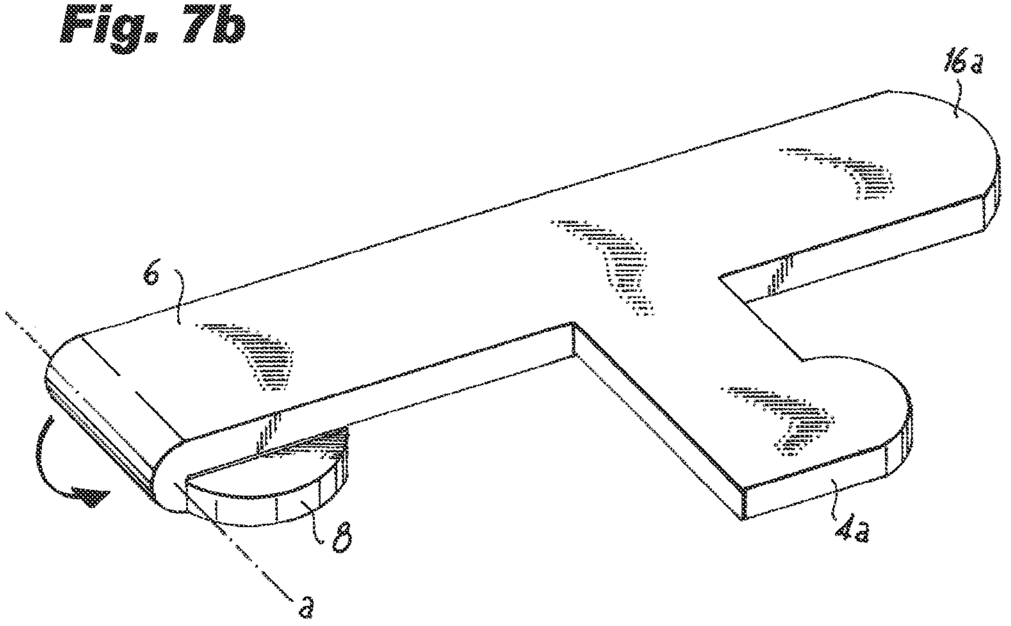

Blank 1*a* is bent about axis "a" with a minimum radius of curvature so that base region 8*a* lies against the adjacent portion of the blank as shown in FIG. 7*b* to form the base 8, as shown in FIGS. 3*a* and 3*b*. Lower contactor 6 is formed by the surface of the blank opposite from base 8. As shown in 7*c*, tongue region 4*a* is bent about axis "b" to form tongue 4. The radius of curvature about axis "b" is selected so that tongue 4 is separated from the adjacent surface a distance sufficient to accept insertion of a conductor on the finished clip. As shown in FIGS. 7*c* and 7*d*, the blank is bent about axis "c" so that the lower side of tongue 4 is parallel to lower contactor 6 and is separated by a distance sufficient to accept insertion of a conductor on the finished clip. The blank is bent about axes "d" and "e" to form prong 16.

Blank 1*a* used to form clip 1 may be formed from a variety of conductive materials. Where terminal 1 is intended to allow conductors to be repeatedly connected and disconnected, a material is selected that provides sufficient elastic deformation so that when force applied by set screw 102 to clip 1 is removed, clip 1 returns to the same or substantially the same configuration as before force was applied. Such a clip may be formed from resilient alloys such as spring steel, phosphor bronze, beryllium copper, and the like. On the other hand, where conductors will be connected with terminal 100 and will remain connected permanently, clip 1 may be formed from malleable material, for example, lead or an alloy of lead.

Blank 1*a* may be cut from a sheet of material, for example, using a punch die. Features of clip 1 may be formed on blank 1*a* prior to folding. For example, a textured surface may be formed on one or both sides of tongue region 4*a* and/or on the portions of the blank forming the upper and lower contactors 2 and 6 by embossing these regions prior to the folding. Likewise, other features, such as grooves 4', 4" discussed with respect to FIG. 6, may be stamped into the surface of tongue region 4*a*. According to one embodiment, embossing and/or stamping operations are applied only to tongue region 4*a* to avoid work hardening portions of blank 1*a* that are subject to bending operations about axes a-e.

While illustrative embodiments of the disclosure have been described and illustrated above, it should be understood that these are exemplary of the disclosure and are not to be considered as limiting. Additions, deletions, substitutions, and other modifications can be made without departing from the spirit or scope of the disclosure. Accordingly, the disclosure is not to be considered as limited by the foregoing description.

I claim:

1. A terminal connector comprising:

a terminal block;

a bore hole in the terminal block;

a connector hole in the terminal block, the connector hole intersecting the bore hole, the connector hole comprising an opening in the terminal block adapted to accept insertion of one or more electrodes; and a clip disposed within the bore hole, wherein the clip comprises:

an upper planar contactor;

a lower planar contactor; and a tongue having an upper and a lower tongue surface, wherein the tongue is disposed between the upper contactor and lower contactor, wherein spaces between the tongue and the upper and lower contactors are each adapted to receive the electrode through the connector hole.

2. The terminal connector of claim 1, wherein, the bore hole comprises a threaded inner surface and wherein the terminal connector further comprises a set screw engaged with the threaded surface of the bore hole, wherein the set screw exerts force on the clip to compress the upper planar contactor toward the upper tongue surface and the lower tongue surface toward the lower planar contactor.

3. The terminal connector of claim 1, wherein the one or more electrodes comprise a spade connector.

4. The terminal connector of claim 1, wherein the clip is formed from a contiguous piece of material.

5. The terminal connector of claim 4, wherein the upper planar contactor and the lower planar contactor are connected by a first c-shaped bend about a first axis and wherein the tongue is connected with one of the upper planar contactor and the lower planar contactor by a second c-shaped bend about a second axis and wherein the first and second axes are orthogonal to one another.

6. The terminal connector of claim 5, wherein the clip further comprises a base plate, the base plate disposed between the lower planar contactor and a bottom surface of the bore hole, wherein the base plate is shaped to conform to and engage with at least a portion of an inner diameter of the bore hole and to rest on the bottom surface of the bore hole, wherein the first axis is disposed perpendicular to the connector hole, and wherein the second axis is disposed parallel to the connector hole.

7. The terminal connector of claim 1, wherein the tongue further comprises a ramped portion on one or more of the upper tongue surface and lower tongue surface, wherein the ramped portion is arranged along an edge of the tongue facing the connector hole.

8. The terminal connector of claim 5, wherein one or more of the upper tongue surface and lower tongue surface comprise an embossment.

9. The terminal connector of claim 8, wherein the embossment comprises one or more of a smooth surface, textured surface, and a partial cylindrical slot.

10. The terminal connector of claim 1, wherein the clip further comprises a capture prong above the upper planar contactor, wherein the capture prong is shaped to engage with an inner diameter of the bore hole, wherein engagement between the capture prong and the bore hole retains the clip within the bore hole.

11. A method of forming a clip for a terminal connector comprising the steps of:

providing a sheet of conductive material;

providing a punch die, the punch die comprising a blade that defines:

an upper planar contactor shaped region;

a lower planar contactor shaped region;

a contactor connector region, the contact connector region being contiguous with the upper and lower planar contactor shaped regions; and a tongue shaped region, the tongue shaped region contiguous with one of the upper contactor shaped region and the lower contactor shaped region; and applying the punch die to the sheet, wherein a clip blank is cut from the sheet by the punch die, and wherein the upper planar, lower planar, and tongue shaped regions of the die form on the clip blank an upper contactor and a lower contactor connected by a contactor connector and a tongue connected with one of the upper contactor or the lower contactor.

12. The method of claim 11, further comprising the steps of:

first bending the tongue perpendicular to a face of the clip blank about a first axis; and second bending the contact connector region about a second axis perpendicular to the first axis to form the contactor connector so that the upper and lower connectors are substantially parallel with the tongue.

13. The method according to claim 11, following the step of punching, further comprising embossing one or more surface features on the tongue.

14. The method of claim 13, wherein the surface feature comprises a sloped ramp portion along an edge of the tongue on at least one of an upper tongue surface and a lower tongue surface.

15. The method of claim 13, wherein the surface feature comprises a slot adapted to conform to a portion of a cylindrical electrode.

16. The method of claim 12, wherein the surface feature comprises a textured surface adapted to provide a mechanical connection with a surface of a spade connector.

17. The method of claim 11, wherein the conductive material is a metal or metal alloy.

18. The method connector of claim 17, wherein the metal alloy is an alloy of copper, iron, or lead.

19. The method connector of claim 18, wherein the metal alloy is selected from spring steel, phosphor bronze, beryllium copper and an alloy of lead.

* * * * *